2,762,682

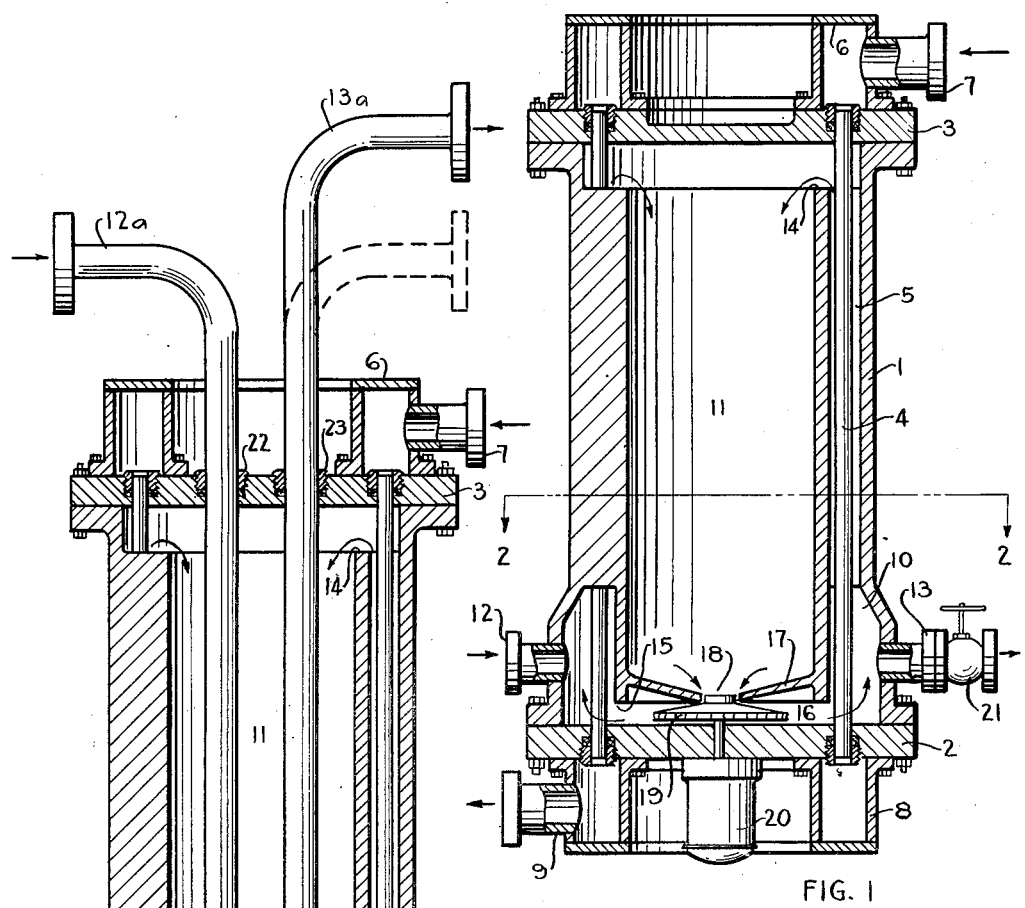
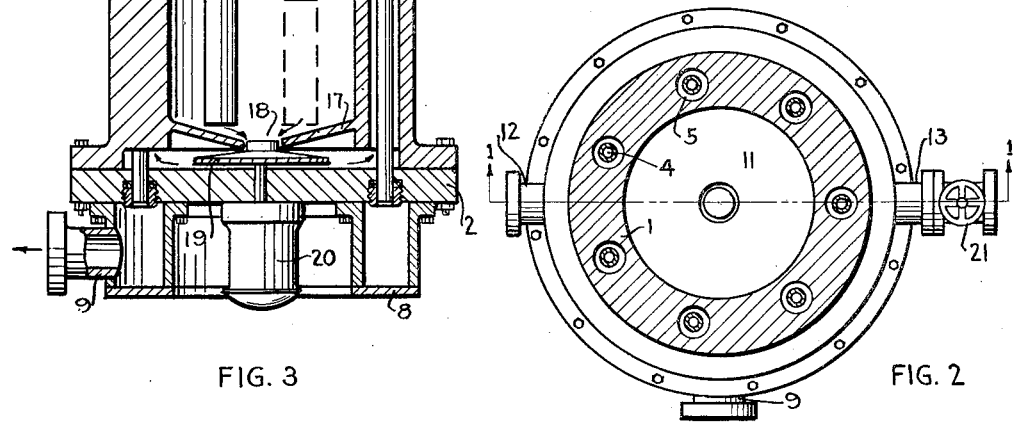
FIG. 1
FIG. 2
FIG. 3
Inventor:
Cornelius G. Van De Wateren
By: Oswald H. Milmore
His Attorney

United States Patent Office 2,762,682
Patented Sept. 11, 1956

METHOD AND REACTOR FOR CONTINUOUSLY REACTING LIQUIDS WHILE ADDING OR REMOVING HEAT

Cornelius G. van de Wateren, The Hague, Netherlands, assignor to Shell Development Company, San Francisco, Calif., a corporation of Delaware Application February 12, 1949, Serial No. 76,144

3 Claims. (Cl. 23—1)

This invention relates to a method and to a reactor for continuously effecting reactions between liquids wherein heat is added or removed, as would be the case in endothermic or exothermic reactions, respectively. More particularly, it is concerned with improvements in regulating the residence of the reacting mixture within the reactor.

If the quantity of liquid supplied to and discharged from the reaction vessel per unit of time is constant, the residence time of the mixture within the reaction vessel, i. e., the time during which the reacting mixture is subjected to conditions favorable to the course of the reaction, is determined by the liquid capacity of the vessel, this time period being in the usual case directly proportional to the capacity. If it is desired to vary the residence time without altering the feed rate, the liquid capacity or contents of the vessel must be correspondingly varied, as by changing over to another vessel, or altering its volumetric capacity, or operating a partially filled reactor at a higher or a lower liquid level. If the vessel is fitted with heat transfer devices, such as cooling or heating tubes or a heated wall, such changes in operation present the question how to contact the entire surface of these devices, regardless of the contents or liquid level within the vessel.

For example, one may consider an exothermic reaction, such as a sulphonation reaction carried out in a reactor wherein the rate of feed of sulfuric acid and hydrocarbons (e. g., alkyl benzene) to the reactor are constant (as would be the case where the hydrocarbons must be fed at a rate determined by their rate of discharge from a prior unit in the plant) and the rate of cooling liquid fed through vertical cooling tubes in the reactor has been properly correlated to these feed rates. If, for some reason, it becomes necessary to, say reduce the residence time and the liquid level is lowered for this purpose, a smaller portion of the cooling tubes remain in contact with the reacting liquids and the temperature tends to rise to a level above that required for maximum conversion, unless an adjustment is made in the rate or temperature in the cooling fluid passed through the cooling tubes. This last mentioned adjustment is inconvenient and considerable experience is necessary to make the correct adjustment. Similar and converse effects are observed when it becomes necessary to increase the residence time and in endothermic reactions. The use of upright heat transfer elements such as jackets, coils or tubes, in reaction vessels is very often highly desirable or necessary to provide the required heat transfer surface within limited reaction zones taking into account the permissible temperature gradient within the reacting mixture, and it is not, therefore, always practicable to provide such heat transfer elements only in a lower part of the reaction vessel which would be submerged regardless of the liquid level therein.

These problems have heretofore made it difficult to regulate the residence time within reactors of the type above indicated, and have complicated process control.

It is, therefore, the principal object of the invention to simplify process control for continuous chemical reactions involving addition or abstraction of heat by providing an improved method of regulating the residence time of a reacting mixture of liquids within a reactor by altering the liquid level therein, wherein the rate of heat transfer to or from the mixture is substantially unaffected by such changes in liquid level; and by providing an improved reactor wherein such method may be easily carried out.

A further object is to provide an improved reactor for continuously carrying out reactions between liquids while adding or removing heat, having separate compartments or zones, one of which being provided with heat transfer elements and the other one of which serves as the variable liquid level reaction zone, provided with means for circulating the reacting mixture successively through said zones and arranged to permit the liquid level within the variable liquid level reaction zone to be controlled as desired for regulating the residence time, independently of the liquid level within the zone containing the heat transfer elements, which is preferably maintained completely filled.

Still further objects will become apparent from the following description.

According to the invention the problem has been solved by continuously supplying the liquids to be reacted into a reactor having two zones or compartments, herein for convenience referred to as the variable liquid level reaction zone and the temperature conditioning zone, respectively, the latter having heat transfer means, and continuously circulating the liquids as a reaction mixture successively through said zones while maintaining said temperature conditioning zone filled to a constant level, preferably completely, and regulating the residence time of the mixture by withdrawing the reacting mixture from the reactor at a rate to maintain a selected level in the variable liquid level reaction zone. Thus, the liquid level in the temperature conditioning zone is fixed while that within the variable liquid level reaction zone is variable. The size of the variable liquid level reaction zone is, preferably, greater than that of the temperature conditioning zone.

A reactor suitable for carrying out the method may advantageously comprise an upright vessel provided with an upright, internal wall structure arranged to subdivide the vessel into the aforesaid temperature conditioning and variable liquid level reaction zones, the wall being terminated below the top of the vessel or provided with ports, etc., so as to afford flow communication near the top of the two zones through which the liquid mixture may flow from the temperature conditioning zone; the reactor is further provided with pump means, such as a rotary circulating pump located within or outside of the vessel, for circulating the liquid mixture from the variable liquid level reaction zone, e. g., from the bottom thereof, into the heat conditioning zone. The heat transfer elements are provided to be in heat exchange relation to the liquid mixture traversing the heat conditioning zone, and may take the form of jackets surrounding the said zone or tubes or coils contained therein and preferably extending throughout the height of the heat conditioning zone. This zone is kept constantly filled by the pump up to the level where the zone communicates with the variable liquid level reaction zone, independently of the level in the latter zone. The latter level may be controlled by controlling the rate of drawoff, e. g., by means of a manually or liquid level-controlled valve, or by means of a vertically adjustable drawoff line.

In order to insure a proper heat transfer between the liquid mixture and the heat transfer elements it is often necessary to keep the flow passage in the temperature conditioning zone surrounding these elements narrow. This may be easily attained by designing the reaction vessel according to the invention as a vertical cylinder having a thick wall serving both as the outer wall of the vessel and as the wall structure for subdividing the vessel into two chambers defining the said zones, this wall having a plurality of upright or vertical bores or channels collectively constituting the temperature conditioning zone and containing tubular heat transfer elements, the bores and tubes being arranged in a circle. The top of each bore or channel communicates with the central variable liquid level reaction zone in the vessel and forms an overflow line into the central reaction zone, in which the liquid level is controlled. The heat transfer elements may be advantageously designed as straight tubes extending between the bottom and top of the vessel. This axially symmetrical disposition of the channels and tubes enables the circulation pump to be arranged centrally within the vessel and to be designed, for example, as a centrifugal pump with a vertical axis, situated near the bottom of the vessel, with its suction side connected to the central reaction zone and its delivery side to the circle of channels. The circulating pump may, of course, also be situated externally of the vessel and connected to the two zones by means of conduits. It is possible for the ratio between the liquid volume, which must be constantly present in the vessel (i. e., the volume corresponding to the capacity of the channels, increased by that of the pump casing), and the maximum liquid volume (i. e., the volume corresponding to the total capacity of the vessel), to become small (for example, 1:10), which implies that the adjusting range of the residence time becomes wide.

The invention will be further described by reference to the accompanying drawings forming a part of the specification and illustrating certain preferred embodiments of the invention, wherein:

Fig. 1 is a vertical sectional view through a reactor taken on line 1—1 of Fig. 2;

Fig. 2 is a horizontal cross sectional view taken on line 2—2 on Fig. 1; and

Fig. 3 is a vertical sectional view showing a modified construction.

Referring to Figs. 1 and 2, the vessel has a thick, vertical, cylindrical wall 1 closed at the bottom by a base 2 and at the top by a cover 3. A plurality of heat transfer tubes 4, e. g., cooling or heating tubes, forming heat-transfer walls, extend from the top to the bottom through and concentrically with slightly larger vertical bores 5 formed in the wall and arranged in a circle, preferably spaced uniformly about the wall. Thus, the wall 1 may be regarded as providing an outer wall structure (consisting of the portion thereof radially outside of the bores 5) and an inner wall structure (consisting of the portion thereof radially inside of the bores 5), connected radially at intervals between the bores 5. Thermal fluid, e. g., cooling liquid, is supplied to the tubes via an annular manifold 6 fitted to the top of the cap 3 in leak-tight manner and in communication with the upper ends of the tubes and having an inlet pipe 7. The fluid is discharged at the bottoms of the tubes into a communicating annular manifold 8, which may be bolted to the base 2 in leak-tight manner, and which has an outlet pipe 9. The lower part of the wall is enlarged to provide an annular chamber 10 communicating with the lower ends of the bores 5. The chamber 10 and bores 5 collectively form the annular temperature conditioning chamber or zone of the reactor, and the central substantially cylindrical chamber 11 within the wall, extending from the base 2 upwards almost to the cap 3, constitutes the variable liquid level reaction zone.

The vessel is provided with liquid supply and liquid discharge pipes 12 and 13, respectively, which communicate with the annular chamber 10 at diametrically opposite sides. The inner portion of the wall 1 is broken away at 14 to afford a passageway from the bores 5 into the chamber 11 at the top of the bores. The wall is, further, cut away at 15 to provide a lower passageway between the chamber 10 and an annular chamber 16 beneath the slightly conical false bottom 17 of the variable liquid level reaction chamber 11. The false bottom 17 has a central opening 18 enclosing the suction side of a centrifugal pump impeller 19, driven by an electric motor 20, located externally. The pump discharge is arranged in the space between the base 2 and bottom 17.

The apparatus operates as follows: The liquids, which may be premixed if desired, are supplied in a continuous flow through feed pipe 12 and are absorbed in the liquid mass or reaction mixture already in the reactor which is pumped outwardly through annular chamber 16 and 10 by circulating pump 19 and pass upwardly through the channels 5 which constitute the upper parts of the temperature conditioning zone. The liquid mixture then flows over the edge 14 into the central reaction chamber 11, being thereafter again sucked up by the pump. A part of the circulating mixture is continuously discharged at 13. When passing through the bores 5 the mixture comes into close contact with the tubes 4 and is thus brought to or maintained at the required temperature. The space between the tubes and the surrounding annular walls of the bores 5 should be such as to insure proper heat transfer.

The level in the central reaction chamber 11 is controlled in accordance with the desired residence time, for example, by controlling the position of a flow control valve 21 in the discharge pipe 13.

Level control may also be effected in another manner, for example, by a drawoff tube having its intake end vertically adjustable within the central variable liquid level reaction chamber 11. Such an embodiment is illustrated in Fig. 3, wherein like parts bear like reference numbers. In this embodiment the wall enlargement forming the annular chamber 10 is omitted and the chamber 16 is in communication directly with the lower ends of the bores 5. The liquid supply pipe 12a enters the reactor through the cap 3 and stuffing box 22 and discharges liquid at a point within the central reaction chamber near the bottom 17. The discharge pipe 13a also extends through the cap 3 and is vertically slidable within a stuffing box 23, whereby the height of its inner, intake end may be vertically adjusted. The discharge end of the pipe 13a may be maintained at any desired, preferably constant pressure less than the pressure within the central reaction chamber. Liquid mixture will be discharged through it until the liquid level falls to the bottom of the pipe, but the liquid level within the chamber 11 cannot fall below the bottom of the pipe. By vertical adjustment of the pipe 13a the liquid level and, hence, the residence time of the liquids within the reactor can be regulated, independently of the liquid level within the bores 5, which are at all times filled to the edge 14.

As stated above, the circulation pump need not be located inside of the vessel, but may also be fitted externally. However, in the illustrated embodiments the internal arrangement of the pump has the advantage that the minimum liquid capacity of the reaction chamber can be kept lower. As a matter of fact, this minimum liquid capacity of this chamber does not exceed the aggregate volume of the bores 5, thus amounting to only a small fraction of the total capacity of the vessel. This insures that the residence time may be controlled within very wide limits.

The apparatus may be used for exothermic and endothermic chemical reactions as well as for those reactions which, from a thermical point of view, are substantially neutral and in which the temperature is to be maintained within certain limits.

This appartus and method are particularly suitable for reactions requiring the removal of heat, such as the sulphonation of alkylates.

I claim as my invention:

1. Method of reacting liquids while continuously adding or removing heat therefrom comprising the steps of: continuously supplying said liquids as a reaction mixture to a reactor that includes two separate zones; continuously circulating said liquids as a reaction mixture successively through said two zones while maintaining the liquid level in one of said zones at a constant level that is independent of the liquid level in the other zone and flowing said mixture in said one zone in contact with a heat transfer wall throughout a constant substantial height; transferring heat between said heat-transfer wall and the liquid within said one zone throughout a constant height to maintain a desired reaction temperature in the reaction mixture; continuously withdrawing a part of said circulating reaction mixture from the reactor at a discharge rate approximately equal to said feed rate; and maintaining in said other zone a variable adjusted liquid level beneath said constant level in the said one zone and above the bottom of said one zone by regulating the said discharge rate of the reaction mixture so as to maintain within the reactor a total volume of the mixture that has a variable selected ratio to said feed rate, thereby regulating the residence time of the reaction mixture in the reactor.

2. Method of reacting liquids while continuously adding or removing heat therefrom in a reactor of fixed volume having a pair of separate reaction zones including a variable liquid level zone and a temperature conditioning zone that is volumetrically materially greater than the variable liquid level zone and has a heat-transfer wall throughout a substantial height thereof, comprising the steps of: continuously supplying said liquids to said reactor at a selected feed rate; continuously circulating said liquid as a reaction mixture from the bottom of the variable liquid level zone into the bottom of the heat conditioning zone, thence upwards through the latter in contact with said heat transfer wall throughout a constant height thereof, from the top of the latter zone into the top of the variable liquid level zone, and downwards through the variable liquid level zone while maintaining the temperature conditioning zone filled to a constant level that is independent of the liquid level in the variable liquid level zone; transferring heat between said heat transfer wall and the liquid within said temperature conditioning zone throughout a constant height therein to maintain a desired reaction temperature in the reaction mixture; continuously withdrawing a part of said circulating reaction mixture from the reactor at a discharge rate approximately equal to said feed rate; and maintaining in said variable liquid level zone a variable adjusted liquid level beneath said constant level and above the bottom of the temperature conditioning zone by regulating the said discharge rate of the reaction mixture so as to maintain within the reactor a total volume of the mixture that has a variable selected ratio to said feed rate, thereby regulating the residence time of the reaction mixture in the reactor.

3. A reactor for continuously carrying out reactions between liquids while adding or removing heat therefrom, comprising: a reaction vessel having a bottom and outer upright walls; an inner wall structure spaced from said outer walls and defining an outer, annular heat conditioning chamber between itself and the said outer walls and defining within itself an inner, variable liquid level chamber, said inner wall structure affording an overflow passageway between said chambers near the top of said chambers for the overflow of liquid from the outer chamber into the inner chamber; heat transfer means having heat transfer walls that are exposed to the interior of the outer chamber and extend vertically throughout a substantial height thereof; a supply pipe for continuously supplying liquid to said vessel at a selected feed rate; a discharge pipe for continuously withdrawing liquid from said vessel; a pump having its intake connected to the bottom of said inner chamber and its discharge connected to the bottom of said outer chamber, whereby said outer chamber can be maintained filled with liquid up to the level of said overflow passageway independently of the liquid level in the inner chamber; and a discharge pipe having a vertically adjustable intake that is situated within the said inner chamber for controlling the liquid level within said inner chamber at a variable level beneath said overflow passageway that is independent of the liquid level in said outer chamber and of said selected feed rate, whereby the total volume of liquid in the reaction vessel can be varied for regulating the residence time of said liquids within the reactor.

References Cited in the file of this patent

UNITED STATES PATENTS

| | | |
|---|---|---|
| 1,404,709 | Allbright | Jan. 24, 1922 |
| 1,936,610 | Thomas | Nov. 28, 1933 |
| 2,283,832 | Thomas | May 19, 1942 |
| 2,308,786 | Smith | Jan. 19, 1943 |
| 2,363,834 | Crater | Nov. 28, 1944 |
| 2,380,245 | Keith et al. | July 10, 1945 |
| 2,443,817 | Draeger et al. | June 22, 1948 |
| 2,474,592 | Palmer | June 28, 1949 |
| 2,577,856 | Nelson | Dec. 11, 1951 |

OTHER REFERENCES

The Refiner, vol. 21, No. 6, page 37.